(12) United States Patent
Wixey et al.

(10) Patent No.: US 8,661,701 B2
(45) Date of Patent: Mar. 4, 2014

(54) DIGITAL ANGLE GAUGE

(76) Inventors: Barry Douglas Wixey, Sanibel, FL (US); Shi Jian, Guilin (CN); Li Guang Jin, Guilin (CN)

( * ) Notice: Subject to any disclaimer, the term of this patent is extended or adjusted under 35 U.S.C. 154(b) by 303 days.

(21) Appl. No.: 12/930,361

(22) Filed: Jan. 5, 2011

(65) Prior Publication Data

US 2011/0197651 A1 Aug. 18, 2011

Related U.S. Application Data

(60) Provisional application No. 61/338,360, filed on Feb. 17, 2010.

(51) Int. Cl.
*G01B 3/56* (2006.01)
(52) U.S. Cl.
CPC ........................................ *G01B 3/56* (2013.01)
USPC .......................................................... 33/534
(58) Field of Classification Search
USPC ............................................................ 33/534
See application file for complete search history.

(56) References Cited

U.S. PATENT DOCUMENTS

| | | | | |
|---|---|---|---|---|
| 4,852,266 A * | 8/1989 | Whitman et al. | ........... | 33/366.11 |
| 4,912,662 A * | 3/1990 | Butler et al. | ........... | 702/154 |
| 4,995,169 A * | 2/1991 | Lunden | ........... | 33/534 |
| 5,133,135 A * | 7/1992 | Durfee, Jr. | ........... | 33/534 |
| 5,174,035 A * | 12/1992 | Yamazaki | ........... | 33/395 |
| 5,313,713 A * | 5/1994 | Heger et al. | ........... | 33/366.14 |
| 5,337,489 A * | 8/1994 | Mustafa | ........... | 33/832 |
| 5,459,676 A * | 10/1995 | Livingston | ........... | 700/296 |
| 5,586,395 A * | 12/1996 | Malczewski | ........... | 33/471 |
| 5,592,745 A * | 1/1997 | Heger et al. | ........... | 33/366.12 |
| 5,761,818 A * | 6/1998 | Hopkins et al. | ........... | 33/366.14 |
| 5,870,832 A * | 2/1999 | Slocum | ........... | 33/511 |
| 5,887,351 A * | 3/1999 | Arms et al. | ........... | 33/1 PT |
| 5,937,371 A * | 8/1999 | Gruetzmacher | ........... | 702/154 |
| 5,956,260 A * | 9/1999 | Heger et al. | ........... | 702/154 |
| 5,992,032 A * | 11/1999 | Chiang et al. | ........... | 33/366.11 |
| 6,037,874 A * | 3/2000 | Heironimus | ........... | 340/686.1 |
| 6,240,646 B1* | 6/2001 | Ronnmark et al. | ........... | 33/1 PT |
| 6,334,257 B1* | 1/2002 | Den Ouden | ........... | 33/1 N |
| 6,410,932 B2* | 6/2002 | Johnson | ........... | 250/577 |
| 6,460,263 B1* | 10/2002 | Matsumoto | ........... | 33/534 |
| 6,671,972 B2* | 1/2004 | Mitterreiter et al. | ........... | 33/534 |
| 6,722,050 B2* | 4/2004 | Winton, III | ........... | 33/534 |
| 6,912,791 B2* | 7/2005 | Tateishi et al. | ........... | 33/1 PT |
| 7,188,426 B2* | 3/2007 | Barr | ........... | 33/366.19 |
| 7,319,514 B2* | 1/2008 | Ritchie et al. | ........... | 356/138 |
| 7,472,489 B2* | 1/2009 | Frank | ........... | 33/530 |

(Continued)

OTHER PUBLICATIONS

Digital Angle Gauge Model WR 300, Wixey, available on the Internet Archive at <http://web.archive.org/web/20070803181640/http://www.wixey.com/anglegauge/owners/images/wr300.pdf>, Aug. 3, 2007.*

(Continued)

*Primary Examiner* — David A Rogers
(74) *Attorney, Agent, or Firm* — William E. Noonan

(57) ABSTRACT

A digital angle gauge includes a gauge body having a reference surface that is engageable with an object to be measured for angular inclination. An angle sensor and processor mounted in the body determine an inclination angle of the object with which the reference surface of the gauge body is engaged. A digital screen is pivotally mounted to the gauge body for visually displaying the determined inclination.

13 Claims, 4 Drawing Sheets

(56) References Cited

U.S. PATENT DOCUMENTS

| | | | |
|---|---|---|---|
| 7,472,611 B2 * | 1/2009 | Hanazawa et al. | 73/862.626 |
| 7,513,161 B2 * | 4/2009 | Sato et al. | 73/622 |
| 7,549,235 B2 * | 6/2009 | Alders | 33/760 |
| 7,610,689 B1 * | 11/2009 | Zhang | 33/366.11 |
| D607,760 S * | 1/2010 | Liao | D10/65 |
| 7,684,028 B2 * | 3/2010 | Willcock et al. | 356/213 |
| 7,685,735 B2 * | 3/2010 | Kim | 33/784 |
| 2001/0037581 A1 * | 11/2001 | Akhavan-Sigari et al. | 33/807 |
| 2003/0218469 A1 * | 11/2003 | Brazell et al. | 324/637 |
| 2004/0083616 A1 * | 5/2004 | Hamar | 33/366.11 |
| 2007/0056179 A1 * | 3/2007 | Beall | 33/640 |
| 2007/0245578 A1 * | 10/2007 | Clark et al. | 33/365 |
| 2009/0201637 A1 * | 8/2009 | Daley, Iii | 361/679.29 |
| 2009/0320308 A1 * | 12/2009 | Marcum | 33/521 |

OTHER PUBLICATIONS

Spirit Level. Smudge Apps, Jul. 3, 2009.*
iPhone Spirit Level App, Ousby, Jan. 8, 2009.*

* cited by examiner

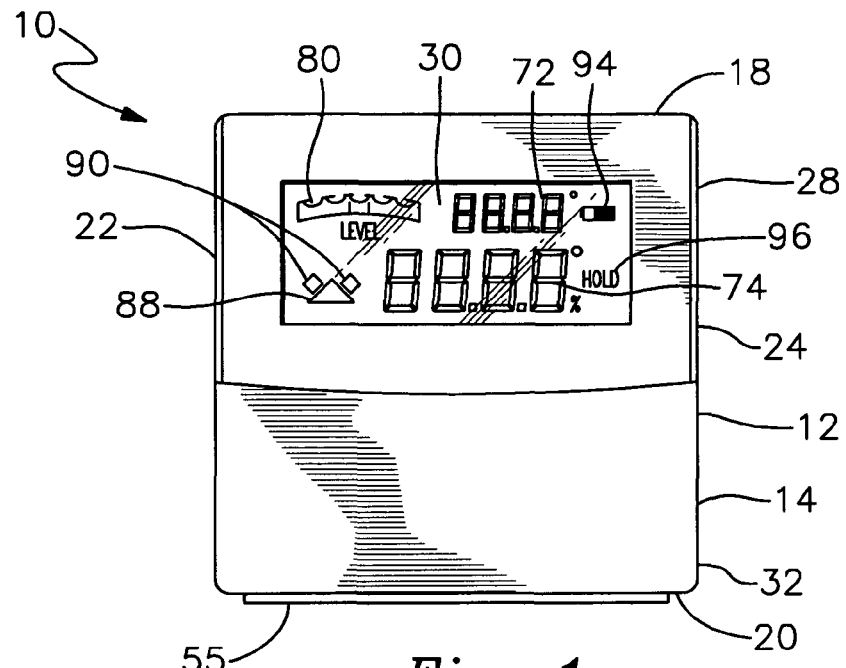
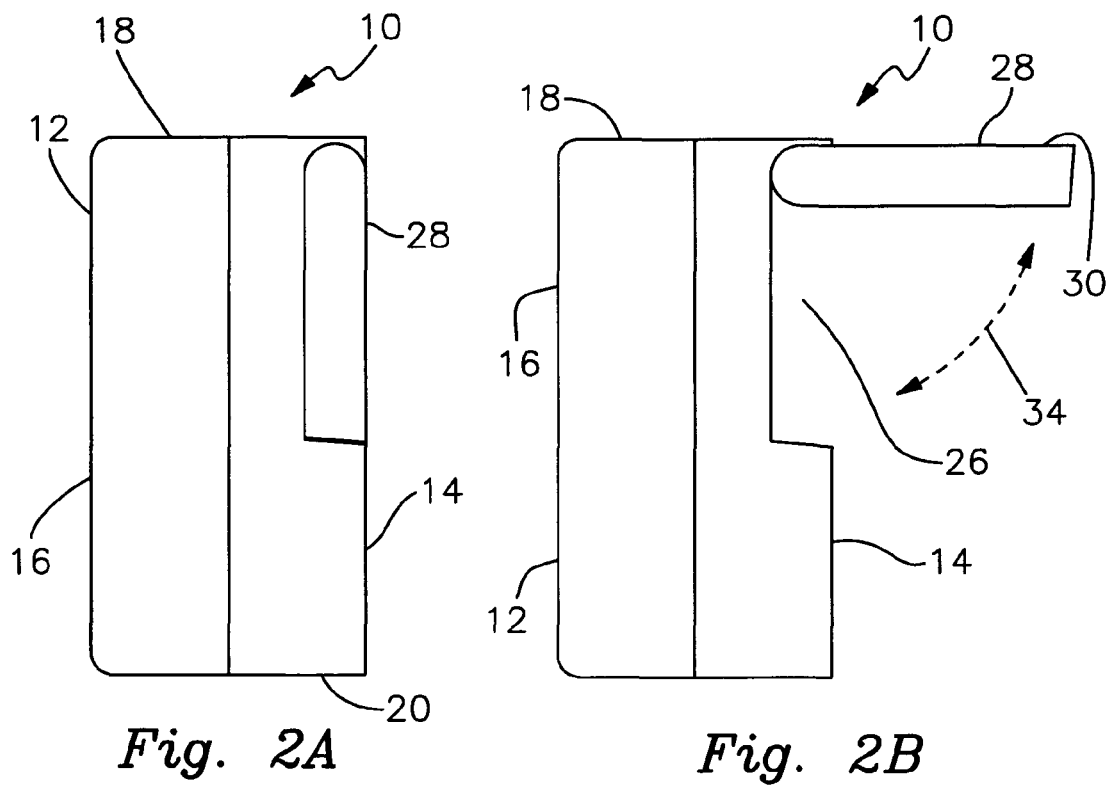
Fig. 1
Fig. 2A
Fig. 2B

DIGITAL ANGLE GAUGE

RELATED APPLICATION

This application claims the benefit of U.S. Provisional Patent Application Ser. No. 61/338,360 filed Feb. 17, 2010.

FIELD OF THE INVENTION

This invention relates to a digital angle gauge, and particularly to an inclinometer type angle gauge featuring a pivoting display screen and operating buttons positioned conveniently on the top face of the device. The digital screen simultaneously displays absolute and incremental numerical measurements accompanied by an intuitive angular display graphic.

BACKGROUND OF THE INVENTION

Various digital angle gauges are currently available for measuring the tilt or inclination of an object or a work surface. Inclinometer-type angle gauges typically feature a generally rectilinear configuration. A digital display screen and operating buttons are mounted on a vertical front face of the device. At least one side surface of the inclinometer functions as a reference surface for engaging the work surface or object to be measured for inclination.

The foregoing angle gauges usually exhibit one or more shortcomings. The viewing screen is invariably oriented perpendicular to the ground and can be difficult to view and read clearly from above and/or peripherally. By the same token, positioning the push buttons that operate the gauge (for example the ON/OFF and ZERO reference buttons) on the front face of the gauge can be problematic. It can be cumbersome to reliably press these buttons and accurately set the ZERO reference point, particularly since the gauge tends to slide along the work surface when a button on the front face of the gauge is pressed.

Conventional digital angle gauges commonly feature two varieties of inclination measurements. The user can choose to employ an absolute zero point and thereby obtain angular measurements relative to the center of the earth. Alternatively, the user can select and employ an incremental zero point that allows angular measurements to be taken relative to any arbitrary reference surface. Conventional gauges permit the user to alternate between these two modes by engaging a button to switch the screen display to the desired mode. Switching between absolute and incremental measurements can be confusing and cause the user to record incorrect measurements.

SUMMARY OF THE INVENTION

It is therefore an object of the present invention to provide an improved digital angle gauge that allows inclination angles to be measured and viewed much more conveniently and clearly from various viewing positions including above or peripherally to the gauge.

It is a further object of this invention to provide a digital angle gauge that places the operating buttons conveniently and accessibly on the top face of the gauge so that the instrument may be easily and reliably operated and set without shifting, sliding or other disruption.

It is a further object of this invention to provide a digital angle gauge that allows absolute and incremental angular measurements to be displayed clearly and conspicuously in a simultaneous, side by side manner on the viewing screen of the gauge.

It is a further object of this invention to provide a digital angle gauge featuring a graphic display that reliably advises the user of a measured inclination angle in an intuitive and easy to understand fashion.

It is a further object of this invention to provide a digital angle gauge that provides both absolute and incremental inclination measurements without requiring the user to select and switch to a preferred mode of measurement and which therefore avoids the potential confusion and mistakes inherent in prior angle gauges.

This invention results from a realization that conventional inclinometer-type digital angle gauges do not allow for clear and reliable viewing of the digital display screen due to the conventional fixed positioning of the screen on the front, vertically perpendicular face of the gauge. By the same token, the conventional positioning of the operating buttons on the front face of the standard angle gauge makes operating those buttons quite awkward. The present invention overcomes these problems by employing a unique pivoting digital display screen and locating the operating buttons on the upper face of the gauge. The digital angle gauge of this invention also provides a greatly improved display screen with contemporaneously displayed numerical values for both absolute and incremental inclinations. An intuitive graphic in the form of a digital representation of a bubble level vial is also positioned on the display screen adjacent to the numerical angular measurements in order to provide an improved, immediately understandable representation of the measured inclination.

This invention features a digital angle gauge including a gauge body having a reference surface that is engagable with an object to be measured for inclination. An angle sensor and processor are mounted in the gauge body for determining an inclination angle of the surface of an object with which the reference surface of the gauge body is engaged. A digital screen is pivotally mounted to the gauge body for visually displaying the inclination angle.

In a preferred embodiment, the gauge includes a generally rectilinear configuration. The gauge body may include front and back faces, as well as top and bottom faces and a pair of side faces that interconnect the front and back faces. The screen may pivotally attached to the body for being selectively alternated between a closed condition wherein said screen is in substantially flush interengagement with the front face of the gauge body and at least one open condition wherein said screen extends outwardly at a positive angle relative the front face of the gauge body. The front face of the gauge body may include a recess for receiving the screen display when the screen is in the closed condition.

One or more operating buttons may be operatively mounted in the top face of the gauge body. These may include an ON/OFF button for selectively activating and deactivating the angle sensor and digital screen. Buttons may also be mounted in the top face for selectively setting an incremental ZERO reference point and for holding the detected angular measurement in place on the screen. A single button may serve both as the ON/OFF switch and to set the ZERO reference point.

The gauge may include a processor responsive to the angle sensor for determining the absolute inclination of the engaged surface of the object relative to the center of the earth, based upon a calibrated absolute zero angle stored in the gauge. The processor may also or alternatively respond to the angle sensor by determining the inclination of the engaged object relative to a selected zero angle reference point. For example, the operating buttons may include a zero angle calibration button that is momentarily engaged to provide a ZERO reference angle that is stored in memory. The processor receives a detected measurement from the angle sensor and calculates the inclination of the object relative to the position of that object at the ZERO reference angle.

The digital viewing screen may include a first section for numerically displaying the absolute inclination angle and a second section for numerically displaying the incremental inclination angle. The first and second sections may display the absolute and incremental inclination angles simultaneously and adjacent to one another on the digital screen. The numerical measurements in one of the screen sections may be larger than those of the other screen section to facilitate differentiation of the absolute and incremental measurements. The first section may further include an intuitive graphic display for graphically (non-numerically) depicting an inclination angle that corresponds to the absolute inclination angle displayed on the screen. This graphic display may intuitively simulate a bubble level and include the graphic or pictorial representation of a bubble icon movable relative to a simulated vial between multiple inclination positions corresponding to respective absolute angular measurement ranges. A second intuitive graphic screen display, typically displayed adjacent the incremental numerical measurement, may include a design having opposing slopes and a movable an icon that is alternatively positioned adjacent to the slope of the design corresponding to the direction in which the reference surface is inclined.

The reference surface may carry a magnet for removably adhering the gauge body to magnetically attractive material in the object being measured. This helps to maintain the gauge body in place as angular measurements are taken. A "hold" button may be provided to lock the determined angular measurement in place on the digital screen after the gauge is disengaged from the object being measured.

DETAILED DESCRIPTION OF PREFERRED EMBODIMENTS

Other objects, features and advantages will occur from the following description of a preferred embodiment and the accompanying drawings, in which:

FIG. 1 is a front elevational view of a preferred digital angle gauge in accordance with this invention;

FIG. 2 is a top perspective view of the digital angle gauge;

Figure 3:
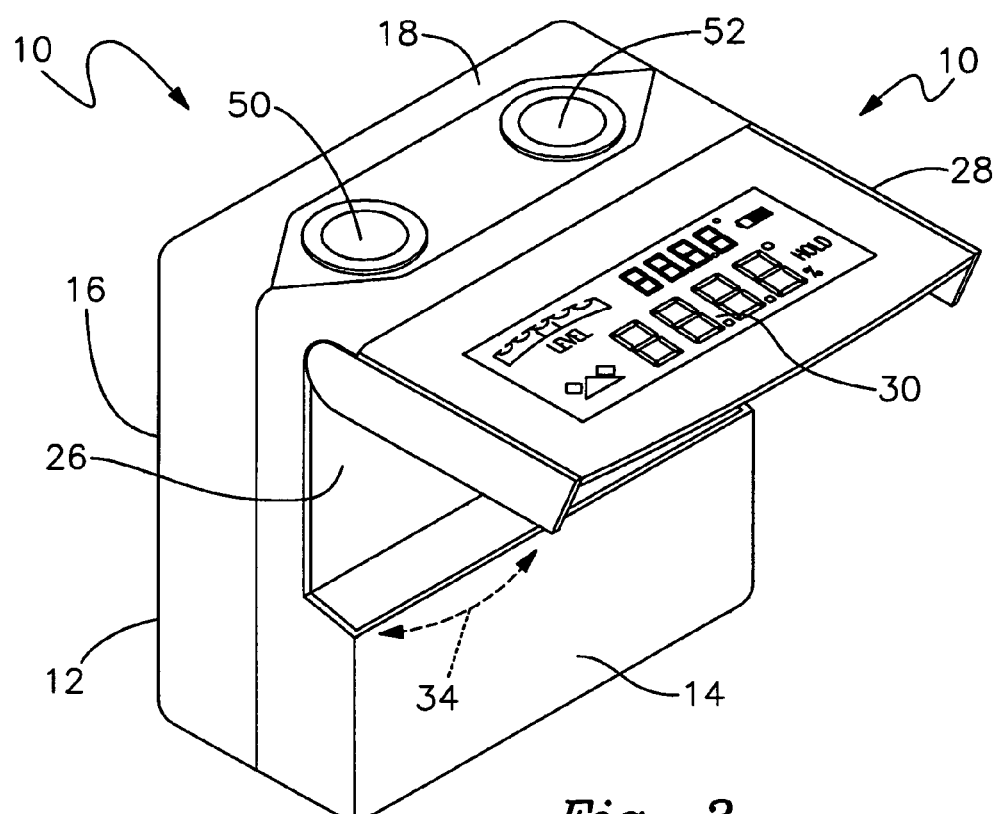
FIG. 3 is a top perspective view of the digital angle gauge, with the pivoting screen in an open condition extending substantially perpendicular to the gauge body.

There is shown in FIGS. 1-3 a digital angle gauge 10 for measuring and displaying the inclination angle of a selected work piece, work surface or other object. As is described more fully below, gauge 10 is constructed to calculate and display both absolute and incremental inclination angle measurements. As used herein, "absolute" measurements relate to the inclination angle relative to the center of the earth. "Incremental" measurements relate to the inclination relative to a selected reference point (referred to herein as the "zero" reference point). Various types of inclinometers and angle gauges are conventionally available for measuring absolute and relative inclination angles. Gauge 10 employs an angle sensor, microprocessor and other electronics analogous to those utilized in the prior art, as well as the improvements disclosed herein, which greatly facilitate and enhance the use of a digital angle gauge in obtaining inclination angle measurements. It should be understood that gauge 10 may be used in any and all applications for which conventional angle gauges and inclinometers are utilized. The particular uses to which gauge 10 may be put do not constitute a limitation of this invention.

Gauge 10 has a generally rectilinear configuration, best depicted in FIGS. 1 and 2, which resembles that of conventional inclinometers. In particular, gauge 10 includes a gauge body 12 having opposing, vertically oriented front and back faces 14 and 16 respectively. Top and bottom faces 18 and 20, as well as opposing side faces 22 and 24, interconnect and extend generally perpendicularly between front and back faces 14 and 16. As best shown in FIG. 3, front face 14 includes a recess 26, which accommodates a pivoting display panel 28. That panel carries a digital display screen 30, which is described in greater detail below. A standard slidable battery compartment door 32, which is typically opened and closed by the user's thumb, is provided through side surface 24 for installing batteries in the angle gauge as required.

Display panel 28 is pivotally attached to gauge body 12 by a pivot assembly that connects the upper end of the panel to the body at the upper end of recess 26. Various known types of pivot constructions of the type conventionally utilized for video cameras, laptop computers and other electronic equipment featuring pivoting display screens may be used for gauge 10. The precise manner of pivotally interconnecting display panel 28 to gauge body 12 is not a limitation of this invention. As a result, display panel 28 and screen 30 are able to pivot, as indicated by double-headed arrow 34, between the closed position shown in FIGS. 1 and 2, and an open condition, as shown in FIG. 3. In the closed condition, panel 28 and screen 30 are received in recess 26 and are in substantially flush interengagement with front face 14 of gauge body 12. The closed panel conformably fits in the recess to provide gauge 10 with an ergonomic rectilinear appearance. In the open condition, panel 28 and screen 30 extend outwardly from gauge body 12 at a positive angle relative to front face 14. Panel 28 may be pivoted open to any selected one of a plurality of angular positions. In FIG. 3, the panel and screen are pivoted open such that they extend generally horizontally and substantially perpendicularly from the front face of gauge body 12. This allows the user to view the display screen 30 clearly and much more conveniently, especially when viewing the gauge from above. Alternatively, panel 28 and screen 30 may be pivoted open such that they extend outwardly from front face 14 of gauge body 12 at a positive angle of less than 90 degrees. The open condition angle may be adjusted to provide the user with the clearest optimal viewing of screen 28 from the particular vantage at which the user is located when the measurements are being taken.

Figure 4:
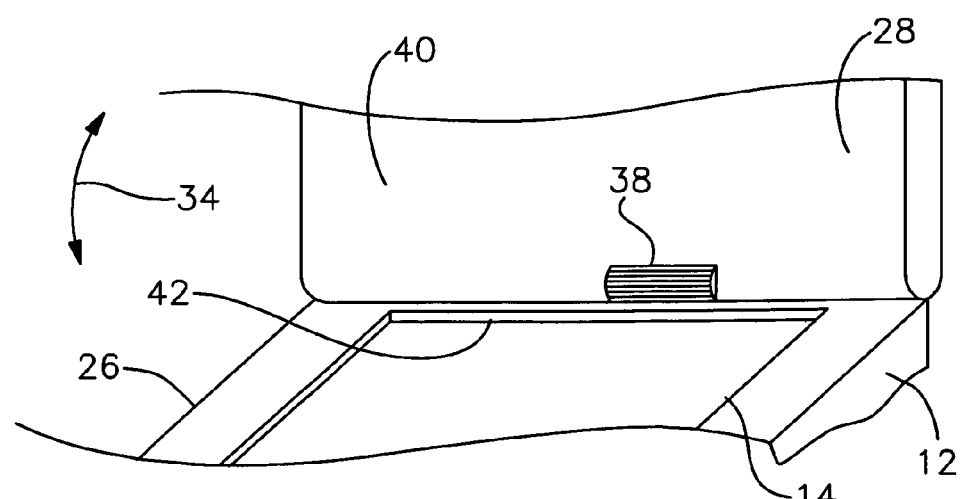
FIG. 4 is a perspective fragmentary view of the underside of the display screen in an open condition relative to the gauge body and particularly depicting the angle retention cam that holds the display screen in a selected angle relative to the gauge body.

The panel may be retained in a selected open angle by a retention cam 38 shown in FIG. 4. In particular, the retention cam comprises a cylindrically curved, knurled or ribbed piece formed integrally on the underside 40 of display panel 28 in proximity with an upper lip 42 formed within recess 26. As panel 28 is selectively opened or closed, in the manner indicated by double headed arrow 34, cam 38 interengages lip 42 and acts to frictionally hold panel 28 open at any selected one of a number of angular positions relative to recess 26 and front face 14 of gauge body 12. As a result, the user may quickly, conveniently and reliably position the display panel and screen at a desired angular orientation relative to the gauge body.

It should also be understood that, in alternative embodiments, display panel 28 and screen 30 may be attached to body 12 in other pivoting configurations. For example, panel 28 may be connected pivotally to the gauge body along the bottom or either side edge of panel 28.

Gauge 10 includes otherwise standard operating buttons that are advantageously mounted on top face 18 of gauge body 12. In particular, as shown in FIGS. 2 and 3, the gauge features an ON/OFF-ZERO button 50 and a HOLD button 52. The functions performed by these operating buttons are described more fully below. Placement of the operating buttons on top face 18 greatly facilitates the convenient and reliable operation of angle gauge 10 in a manner that is likewise described below.

Gauge body 10 and screen panel 28 are typically composed of a durable molded plastic. Various materials may be employed within the scope of this invention. Screen display 30 typically comprises an LCD display or other known types of screen constructions (e.g. LED). The gauge may include various dimensions within the scope of this invention. Typically, the front and back faces are approximately 2-2½ inches square. The gauge has a preferred thickness of approximately 1-1½ inches. These dimensions may be varied within the scope of the invention.

A magnetic strip 55, FIG. 1, or other type of magnetic component is attached to bottom face 20. This allows gauge 10 to be magnetically secured to an underlying surface containing a magnetically attractive material. As a result, inclination measurements may be taken and read more reliably. In such cases, bottom face 20 of gauge body 12 serves as a reference surface for taking that required angle measurement. In alternative embodiments, either of the side surfaces may act as a reference surface for engaging a work piece surface or other object and enabling the gauge to measure the inclination angle of that object.

Figure 5:
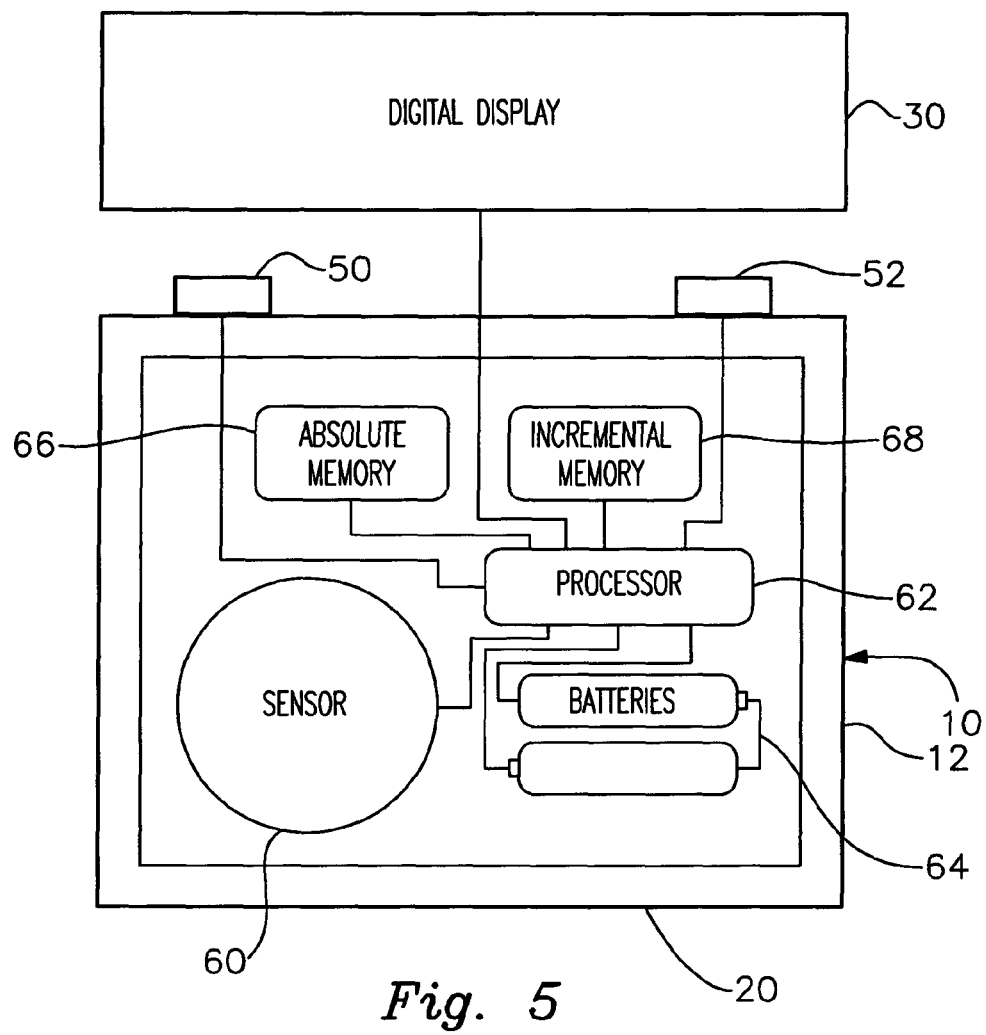
FIG. 5 is a schematic view depicting the principle electrical components of the gauge.

As previously indicated, gauge 10 may employ various electrical/electronic components of the type used in conventional inclinometers and digital angle gauges. FIG. 5 illustrates a schematic of preferred components employed in gauge 10. Gauge body 12 encloses an inclination angle sensor 60, which may comprise various known types of angle sensors, such as a rotary capacitive sensor, a solid-state sensor, a solid-state sensor incorporating an accelerometer, etc. The construction and function of such sensors in the inclinometer and angle gauge art will be known to persons skilled in that art. Sensor 60 measures or detects the tilt or inclination of the gauge (and more particularly the reference surface 20 of the gauge) as attached to an underlying object or surface being measured.

A processor 62, typically comprising a microprocessor, is operably connected to sensor 60 within gauge body 12. Batteries 64 accommodated by an appropriate compartment within the gauge body power the processor. By the same token, operating buttons 50 and 52 are operatively connected to processor 62. The processor is programmed in a conventional manner to determine both absolute and incremental angle measurements. During manufacture, the gauge is calibrated for the absolute zero angle (true level) corresponding to a measurement of no inclination or tilt relative to the center of the earth. That value is permanently stored in absolute memory 66, which typically comprises an EPROM or other type of read only memory. A temporary or RAM incremental memory is provided for storing a ZERO reference angle, which is set by pressing ZERO button 50 after the gauge has been turned on. Processor 62 is programmed to process signals representative of the tilt detected by sensor 60 and to derive both absolute and incremental measurements from those signals. The processor then sends the absolute and incremental angular measurements to display screen 30.

In operation, button 50 is initially pressed to activate the gauge. Reference surface 20 of gauge body 12 is then engaged with a work surface or other object to be measured for inclination. The user next momentarily re-presses button 50 to set a ZERO reference angle into incremental memory 68.

When the work surface or other object is set in the position for which inclination is being measured, sensor 60 measures the tilt of attached gauge 10 and provides a corresponding signal to processor 62. The processor compares this detected value against the values previously stored in memories 66 and 68 and derives (calculates) both absolute and incremental angle measurements. These measurements are sent to digital display 30 to be displayed as described below. The electronic components of gauge 10, as shown in FIG. 5 or as alternatively constructed, are operatively connected to display screen 30 by known means conventionally used to connect pivoting or articulating display panels to other types of electronic equipment (e.g. laptop computer, video cameras, etc.) For example, the processor may be connected to screen 30 by a flexible ribbon cable, respective copper contacts or otherwise.

As best shown in FIG. 1, digital screen 30 displays the angular measurements in various formats that significantly improve understanding, accuracy, readability, and ease of use. A first upper portion of screen 30 includes a numerical designation 72 reflecting the absolute angle measured by gauge 12 relative to the calibrated zero value stored in memory 66. Various numerical formats may be employed, including degrees in either two digits (e.g. up to 90 degrees) or three digits (up to 180 degrees). A decimal place may be provided (as shown after either the second or third display digit) to reflect tenths of degrees. In alternative embodiments, the angular measurement may be displayed for portions of a degree, either fractionally or in minutes and seconds. The manner in which numerals are presented/displayed on screen 30 may be varied with the scope of this invention according to formats known to persons skilled in the art.

A lower portion of screen 30 features a second numerical display 74 reflecting the incremental angular measurement determined by processor 62 with respect to the ZERO reference value set in memory 68. Numerical display 74 is larger than numerical display 72 (particularly when gauge 10 is intended primarily for measuring incremental angles) so that the user can quickly and reliably distinguish between the absolute and incremental measurements. Once again, incremental numerical measurement 74 may be displayed in various formats (e.g. in tens or hundreds of degrees, decimally, fractionally, in minute/seconds, etc.). In addition, the incremental measurement may be displayed as a slope or rise/run as indicated by the "%" indicia adjacent to display section 74.

Figure 6A:
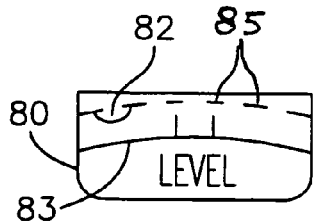
FIGS. 6A-6E are elevational views of respective absolute angle readings provided by the intuitive "bubble level" graphic display used in the digital display screen.
Figure 6B:
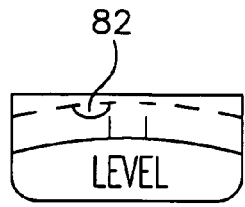
Figure 6C:
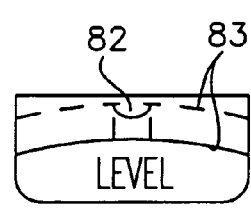
Figure 6D:
Figure 6E:

Various other icons or indicia may be provided on screen 72 to improve the readability and clarity of the screen. Most significantly, screen 30 includes an intuitive graphic display 80 adjacent to the absolute inclination numerical display 72. Display 80 graphically represents a plurality of inclination ranges, within which the numerically displayed absolute inclination angle 72 may be located. More particularly, graphic display 80, which is reflected in FIGS. 6A-E, simulates a bubble level and includes a bubble icon 82 that responds to tilting of the gauge by assuming one of the five angular positions relative to simulated vial 83 reflected in FIGS. 6A-E respectively. Each of these positions represents a range of corresponding absolute numerical angles at which the reference surface of the gauge may be inclined or tilted. For example, if reference surface 20 of gauge 10 tilts downwardly by greater than a programmed angle to the right, icon 82 maintains the lefthand position shown in FIG. 6A. This is analogous to the operation exhibited by a conventional bubble level. If the gauge tilts to the right but less than the foregoing programmed angle, the icon moves to the position shown in FIG. 6B. If the gauge measures no tilt or only a slight tilt not greater than a predetermined amount, a level reading is provided on display 80, wherein icon 82 is positioned between the two vertical hashmarks 85, as shown in FIG. 6C. FIGS. 6D and 6E analogously provide for intuitive graphic representation of inclination of the gauge when it is tilted to the left within like respective angular ranges. Graphic display 80 provides for an easy to read and extremely intuitive means for the user to quickly, understandably and accurately view the approximate absolute angle inclination of a particular work surface or object. A more precise angular measurement can then be quickly and unmistakably ascertained by simply referring to the numerical display 72 adjacent to graphic display 80. The corresponding numeric and graphic displays effectively confirm one another.

Additional graphic icons are provided on screen 30 to improve its viewability. For example, a graphic icon 88, FIG. 1, adjacent to incremental display 74 comprises a triangle having opposing sloped surfaces respectively representing right hand and left hand inclination of gauge 10. Display 88 graphically corresponds to numerical display 74. When reference surface 20 tilts to the right, a square icon 90 appears on the right hand (downward) slope of icon 88. Conversely, when the gauge is tilted to the left, icon 90 appears on the left hand (upward) slope of icon 88.

Screen display 30 also includes a battery icon 94 that is displayed when the batteries fall below a predetermined charge. A "HOLD" designation 96 is displayed on screen 30 when the user presses button 52. This directs processor 62 to lock or hold the numerical measurements 72 and 74 at the respective values detected when button 52 is actuated. As a result, the user can maintain the displayed values so that the gauge can be moved or repositioned without disrupting the displayed measurements.

Figure 7:
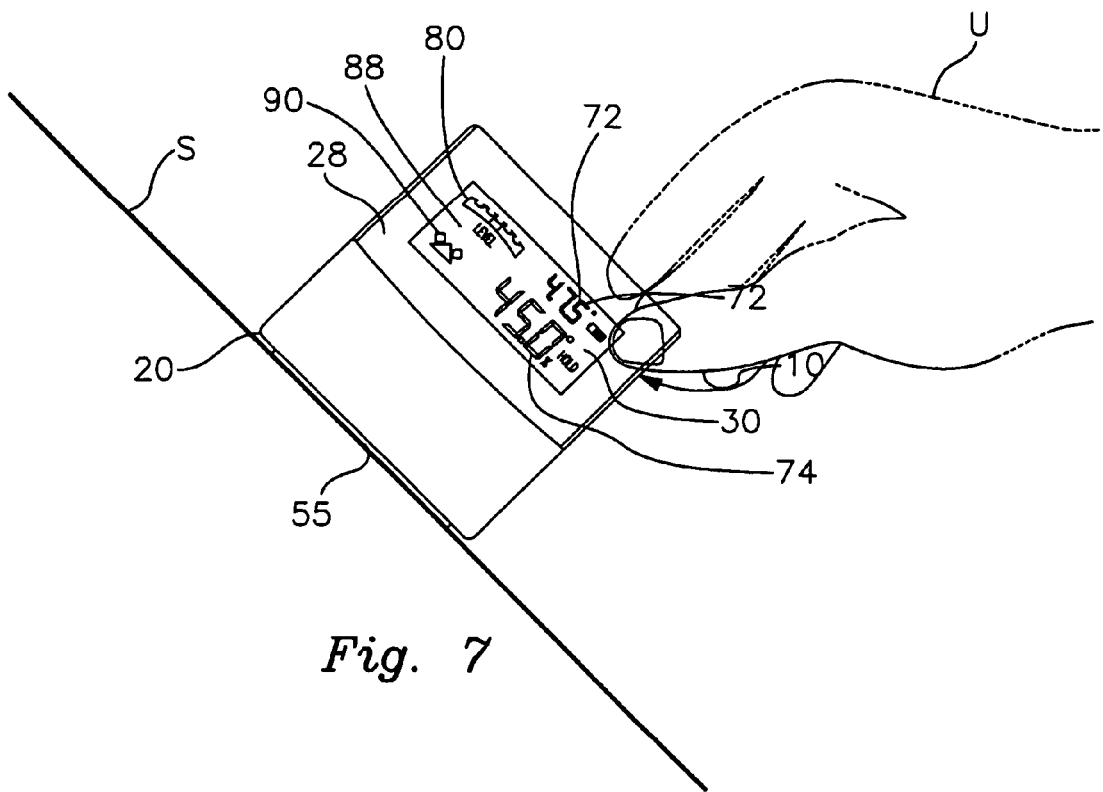
FIG. 7 is a front elevational view depicting the gauge being used to determine and display both absolute and incremental inclination angles of a work surface.

Gauge 10 is shown in operation in FIG. 7. In that example, the reference surface 20 of gauge 10 is engaged with a work surface S. In particular, magnet 55 engages and magnetically adheres to magnetically attractive material in surface S. The work surface itself has a tilt of 2.5 degrees relative to the absolute zero point (i.e. the center of the earth). User U first presses button 50 to activate the gauge. Numerical display 72 shows an angle of 2.5 degrees. The user then momentarily represses button 50 to set a ZERO reference angle into incremental memory 68, FIG. 5. Surface S is then repositioned and tilted to the inclination angle to be measured. Sensor 60 detects that angle and provides a corresponding signal to processor 62. The processor determines both absolute and incremental angle measurements and sends these to screen 30. Portion 74 of screen 30 displays an incremental angle of 45.0 degrees, which indicates that surface S has been tilted 45 degrees from the position at which its ZERO reference was set. At this level, an absolute measurement of 47.5 is displayed in section 72 of screen 30. By the same token, intuitive graphic displays 80 and 88 correspond respectively with the absolute and incremental numerical measurements, as displayed. Graphic display 80 depicts icon 82 at the lefthand position of vial 83. Display 88 depicts icon 90 against the downward righthand slope of the display. To hold these measurements, user U simply presses button 52 and disengages the gauge from work surface S. The measured angles may then be examined and recorded conveniently. Moreover, the angles may be viewed clearly and conveniently from various positions above and to the side of the gauge by simply pivoting screen panel 28 outwardly, such as shown in FIG. 3. Panel retention cam 28 holds this panel and screen display at the selected position to permit convenient viewing.

The pivoting screen display as well as the simultaneous, side-by-side absolute and incremental numerical displays and the adjacent, easy to understand intuitive displays provide gauge 10 with significantly improved ease and clarity of viewing. The user is not required to switch back and forth between absolute and incremental measurements. Guesswork and measurement errors are significantly reduced. The user is able to quickly and reliably ascertain both absolute and incremental measurements for almost an unlimited variety of angle measuring applications. The screen may be quickly and conveniently repositioned as needed for viewing directly in front of the gauge (closed screen) or from above or peripherally to the gauge (open screen).

Placement of the operating buttons on the top face of gauge 10 makes the angle gauge much easier and far less cumbersome to operate. By pressing directly down onto the top face of the gauge, user U avoids unnecessary movement of the gauge, which typically occurs when conventional operating buttons mounted on the front face are employed. The top face mounted buttons of the present invention are far less awkward to access and allow the user to quickly and reliably complete and hold angle measurements without moving or disrupting the gauge.

From the foregoing it may be seen that the apparatus of this invention provides for an improved digital angle gauge utilizing a pivoting display screen, operating buttons conveniently located on the top face and a user friendly display screen featuring simultaneously displayed absolute and incremental measurements, as well as an intuitive angular graphic display in the form of a simulated bubble level. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A digital angle gauge comprising:
a gauge body including a reference surface that is engageable with the surface of an object to be measured for inclination;
means mounted in said gauge body for determining an inclination angle of the surface of an object with which said reference surface of said gauge body is engaged, the inclination angle including an absolute inclination angle determined relative to an absolute zero point stored in said gauge;
a digital screen pivotally connected to said gauge body and responsive to said means for determining for visually displaying the determined absolute inclination angle in both numerical and intuitively graphic formats, said screen including a numerical display portion for numerically displaying the determined absolute inclination angle and a graphic display portion located adjacent said numerical display portion that intuitively and non-numerically depicts the determined absolute inclination angle adjacent to and simultaneously with the numerical display of the determined absolute inclination angle, said graphic display portion simulating a bubble level vial having a plurality of discrete position marking indicia arranged side by side and defining a series of vertically non-overlapping bubble positions between opposing left hand and right hand ends of said simulated bubble vial, each said bubble position in said vial corresponding to a respective range of absolute inclination angles, said graphic display portion further including a simulated bubble icon that is movable in said simulated bubble level vial to assume a bubble position in said vial that corresponds to the determined absolute inclination angle;

said gauge body including opposing front and back faces, opposing top and bottom faces, and a pair of opposing side faces, said top, bottom and side faces interconnecting said front and back faces, said reference surface being defined by one of said bottom and side faces;

a least one manually engageable operating button for operating said gauge, which operating button is mounted in said top face of said gauge body;

at least one said operating button including a ZERO angle calibration button that is momentarily engaged to set an incremental angle reference point, said inclination angle comprising an inclination angle determined relative to said ZERO angle reference point; said numerical display portion for numerically displaying the determined incremental inclination angle; said digital screen for displaying said absolute angle incremental inclination angle simultaneously and adjacent to one another on said screen.

2. The device of claim 1 in which said screen is pivotally alternatable between a closed condition relative to said front face of said gauge body wherein said screen maintains a generally flush interengagement with said front face and an open condition wherein said screen extends outwardly from said gauge body at a positive angle relative to said front face.

3. The device of claim 1 in which said screen is pivotally alternated between angularly closed and open conditions relative to said body, said front face including a recess for receiving said screen in said closed condition.

4. The device of claim 1 in which said numerical display portion displays numbers respectively representing the determined absolute and incremental inclination angles, one of said displayed digital numbers being larger than the other said number to facilitate visual differentiation of the respective numbers.

5. The device of claim 1 in which said screen and said body include an angle retention cam for holding said screen open at a selected one of a plurality of angular positions relative to said gauge body.

6. The device of claim 1 in which said bottom face carries a magnet for securing said body to a magnetically attractive material in the object being measured.

7. The device of claim 1 in which said at least one operating button includes an ON/OFF button that is selectively engaged to alternately activate and deactivate said sensor and said digital screen.

8. The device of claim 7 in which at least one said operating button includes a "HOLD" button for visually locking the display of a determined inclination angle on said screen.

9. A digital angle measuring tool comprising:

a tool body including a reference surface that is engageable with the surface of an object to be measured for inclination;

means mounted in the tool body for determining an absolute inclination angle relative to an absolute zero point stored in said tool body;

a digital screen connected to said tool body for displaying the determined absolute inclination angle in both numerical and intuitively graphic formats; said screen including a numerical display portion for numerically displaying the determined absolute inclination angle and a graphic display portion that intuitively and non-numerically displays the determined absolute inclination angle adjacent to and simultaneously with the numerical display of the absolute inclination angle on the screen, said graphic display portion simulating a bubble level vial having a plurality of discrete position marking indicia arranged side by side and defining a series of vertically non-overlapping bubble positions between opposing left hand and right hand ends of said simulated bubble vial, each said bubble position in said vial corresponding to a respective range of absolute inclination angles, said graphic display portion further including a simulated bubble icon that is movable in said simulated bubble level vial to assume a bubble position in said vial that corresponds to the determined absolute inclination angle; and means mounted in said tool body for determining an incremental inclination angle of the surface to be angularly measured for inclination, said tool body including opposing front and back faces, opposing top and bottom faces, and a pair of opposing side faces, said top, bottom and side faces interconnecting said front and back faces, said reference surface being defined by one of said bottom and side faces, said tool body including at least one manually engageable operating button for operating said tool, said button being mounted on said top face of said tool body, said at least one operating button including a ZERO angle calibration button that is momentarily engaged to set an incremental ZERO angle reference point, said incremental inclination angle comprising an incremental inclination angle determined relative to said ZERO angle reference point, said screen displaying the determined absolute and incremental inclination angles adjacent to and simultaneously with one another, said screen displaying two distinct digital numbers respectively representing the determined absolute and incremental inclination angles, one of said displayed digital numbers being larger than the other said displayed digital number to facilitate visual differentiation of the said determined absolute and incremental angles, said at least one manually engageable operating button being engageable without disrupting said front and back faces of the tool body.

10. The device of claim 9 in which said screen includes a relative tilt display including a first icon for representing the surface being measured for inclination, said first icon having upwardly and downwardly sloped surfaces that are arranged end to end, and a second, tilt indicating icon for being positioned on a sloped surface of said first tilt icon corresponding to the relative tilt of the tool body with respect to the surface being measured for inclination.

11. A digital angle measuring tool comprising:

a tool body having a reference surface that is engageable with a surface to be angularly measured;

means enclosed by said tool body for determining absolute and incremental inclination angles of the surface; and a digital screen connected to said tool body for displaying the absolute and increment inclination angles; said screen displaying both absolute and incremental inclination angles simultaneously and adjacent to one another; said screen employing a numerical display portion for numerically displaying the determined absolute and incremental inclination angles and a graphic display portion located adjacent said numerical display portion that intuitively and non-numerically depicts the determined absolute inclination angle adjacent to and simultaneously with the numerical display of the determined absolute inclination angle, said graphic display portion simulating a bubble level vial having a plurality of discrete, position marking indicia arranged side by side and defining a series of vertically non-overlapping bubble positions between opposing left hand and right hand ends of said simulated bubble vial, said bubble positions corresponding to respective ranges of absolute inclination angles, said graphic display portion further including a simulated bubble icon that is movable in said simulated bubble level vial to assume a bubble position in said vial that corresponds to the determined absolute inclination angle.

12. The device of claim 11 in which said screen numerically displays two distinct digital numbers respectively representing the determined absolute and incremental inclination angles, one of said displayed digital numbers being larger than the other said displayed number to facilitate visual differentiation of the determined absolute and incremental inclination angles.

13. The device of claim 11 in which said tool body includes opposing front and back faces, opposing top and bottom faces, and a pair of opposing side faces, said top, bottom and side faces interconnecting said front and back faces, said reference surface being defined by one of said top and side faces, said tool body including at least one manually engageable operating button for operating said tool, said button being mounted on said top face of said tool body whereby said at least one manually engageable operating button may be engaged when said referenced surface is engaged with the surface being measured for inclination without disrupting said front and back faces of said tool body.

* * * * *